(12) United States Patent
Goodwin, III

(10) Patent No.: US 10,535,059 B2
(45) Date of Patent: Jan. 14, 2020

(54) CODED SCAN-BASED ITEM PROCESSING

(71) Applicant: NCR Corporation, Duluth, GA (US)

(72) Inventor: John Coker Goodwin, III, Suwanee, GA (US)

(73) Assignee: NCR Corporation, Atlanta, GA (US)

(*) Notice: Subject to any disclaimer, the term of this patent is extended or adjusted under 35 U.S.C. 154(b) by 14 days.

(21) Appl. No.: 15/940,860

(22) Filed: Mar. 29, 2018

(65) Prior Publication Data

US 2019/0303911 A1  Oct. 3, 2019

(51) Int. Cl.
*G06K 15/00* (2006.01)
*G06Q 20/32* (2012.01)
*G06K 7/14* (2006.01)
*G06Q 30/06* (2012.01)

(52) U.S. Cl.
CPC ....... *G06Q 20/3223* (2013.01); *G06K 7/1439* (2013.01); *G06Q 30/0641* (2013.01)

(58) Field of Classification Search
CPC .... G06Q 30/00; G06Q 30/06; G06Q 30/0601; G06Q 30/0633; G06Q 30/0635; G06Q 30/0641; G06Q 30/0643
See application file for complete search history.

(56) References Cited

U.S. PATENT DOCUMENTS

| | | | | |
|---|---|---|---|---|
| 6,550,672 B1* | 4/2003 | Tracy | ..................... | G06K 17/00 235/383 |
| 2002/0156688 A1* | 10/2002 | Horn | ................... | G06Q 10/087 705/14.51 |
| 2003/0195818 A1* | 10/2003 | Howell | .................. | G06Q 30/06 705/26.8 |
| 2005/0203810 A1* | 9/2005 | Listenberg | ............. | G06Q 30/06 705/26.8 |
| 2006/0235755 A1* | 10/2006 | Mueller | ............... | G06Q 20/201 705/15 |
| 2010/0287057 A1* | 11/2010 | Aihara | ................. | G06K 7/1095 705/16 |
| 2011/0215138 A1* | 9/2011 | Crum | .................. | G06Q 30/0207 235/375 |
| 2014/0214619 A1* | 7/2014 | Cancro | ............. | G06Q 30/0641 705/26.61 |
| 2014/0379529 A1* | 12/2014 | Agasti | ................ | G06Q 30/0635 705/26.81 |
| 2015/0278927 A1* | 10/2015 | Nakamura | ......... | G06Q 30/0253 705/14.51 |

(Continued)

*Primary Examiner* — Steven S Paik
*Assistant Examiner* — April A Taylor
(74) *Attorney, Agent, or Firm* — Schwegman, Lundberg & Woessner

(57) ABSTRACT

A retail store is comprised of a retail space having billboard paper with images of items and item codes for purchasing the items. The retail store further includes a pick area where physical items of the store are located. A device operated by a user scans the item codes and the item codes are communicated to a server for item information and item pricing. As item identifiers are moved to a cart depicted on the device by the user, the server communicates the item details to a display device in the pick area where corresponding items are picked for a transaction of the user in real time. When the user checks out and pays for the items in the cart, the user retrieves the bagged items for the transaction from a pickup drive-thru accessible from an external area of the retail store where the pick area is located.

11 Claims, 4 Drawing Sheets

(56) References Cited

U.S. PATENT DOCUMENTS

| | | | |
|---|---|---|---|
| 2017/0213277 A1* | 7/2017 | Hong | G06Q 30/06 |
| 2018/0165670 A1* | 6/2018 | Bacallao | G06Q 20/00 |
| 2018/0232799 A1* | 8/2018 | Kitagawa | G09F 19/00 |

* cited by examiner

CODED SCAN-BASED ITEM PROCESSING

BACKGROUND

Network-based shopping has steadily increased in recent years within the retail industry. Brick and mortar stores have suffered substantially as a result of this trend because of rent, costs, inventory of product, and staffing associated with maintaining the physical stores and loss of sales to online competition. One area where consumers are less likely to engage in shopping over the Internet is grocery stores. This is for a variety of reasons, such as consumers want their grocery products at the time that they shop for those products; and consumers like to see and feel perishable goods, such as produce and meat.

Yet, retail space for grocery stores is expensive for grocers that rely on small product profit margins and large sales volumes to sustain their businesses. Furthermore, the retail space and shelf space are not organized for efficiency in selecting items; rather, the retail space and shelf space is based on deals and fees paid by food manufactures to the grocers and based on psychological studies about product placement and behaviors of consumers while in the grocery stores. This creates an inefficient retail space that is significantly larger than it needs to be, but believed necessary to maximize store sales.

Furthermore, larger retail space requires more security to thwart theft and more store personnel to handle stocking the shelves, cleaning the store retail space, and assisting customers.

As a result, grocers have not significantly altered their retail space or layout because they believe that their existing space and the in-person shopping model are necessities for doing business in the grocery industry with the customer.

Some grocers have introduced online shopping where customers order their items online and pick up their items already bagged at the store (with a substantial time lag between ordering and pickup experienced by the customers). But, this model appears to be directed at maintaining a customer base that is less inclined to shop in-person and is more interested in convenience. There has not been substantial growth in the online grocery shopping model and it has not decreased the grocers' retail spaces. Thus, the expense and inefficiencies of conventional grocery shopping at groceries has not substantially changed in the industry; in fact, the trend has been for even larger stores (mega stores).

SUMMARY

In various embodiments, methods and a system for coded scan-based item processing are presented.

According to an embodiment, a method for coded scan-based item processing is presented. More particularly, item codes are received from a mobile application operated to scan the item codes from item images in a store. A transaction identifier is assigned for the item codes for a transaction. The item information based on the item codes is provided to a display device situated in a pick area of the store for item picking items associated with the transaction, and a checkout is completed for the transaction.

DETAILED DESCRIPTION

Figure 1:
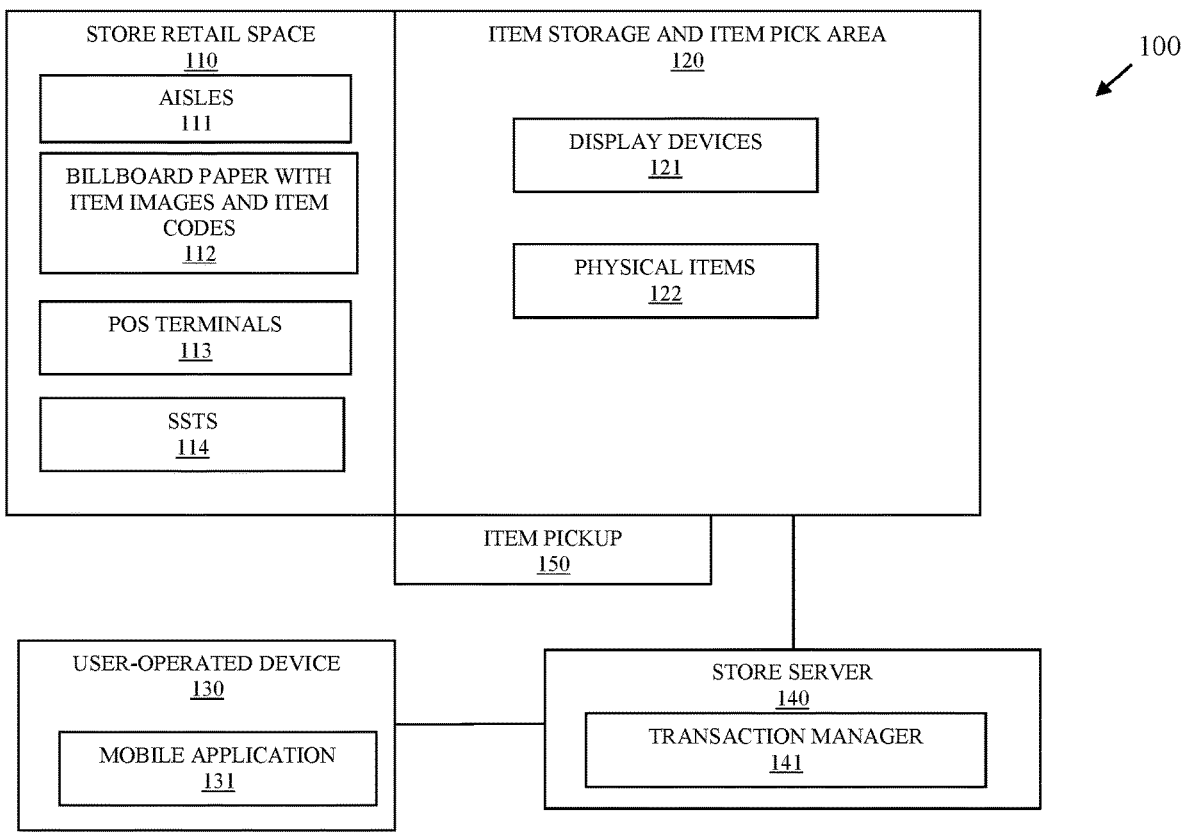
FIG. 1 is a diagram of a system for coded scan-based item processing, according to an example embodiment.

FIG. 1 is a diagram of a system 100 for coded scan-based item processing. The various components are illustrated and the arrangement of the components is presented for purposes of illustration only. It is to be noted that other arrangements with more or less components are possible without departing from the coded scan-based item processing teachings presented herein and below.

The techniques, methods, and system presented herein and below for coded scan-based item processing can be implemented in whole or in part in one, all, or some combination of the components shown with the system 100. The techniques and methods are programmed as executable instructions in memory and/or non-transitory computer-readable storage media and processed on one or more processors associated with the various components.

As used herein the terms "customer," "consumer," and "user" may be used synonymously and interchangeably.

The system 100 includes a store retail space 110 having aisles 111, billboard paper with item images and item codes 112, one or more Point-Of-Sale (POS) terminals 113, and one or more Self-Service Terminals (SSTs) 114. In an embodiment, the POS terminals 113 are operated by clerks of the store to perform checkouts of the customers. In an embodiment, the SSTs 114 are self-checkout kiosks where the customers perform self-checkouts. In an embodiment, the system 100 lacks any POS terminals 113 and/or SSTs 114 and rather relies on just mobile device 130 checkout on a phone or wearable processing device operated by the customer while in the store.

The system 110 also includes an item storage and item pick area 120 having one or more display devices 121 and physical items (goods) 122.

The system 110 further includes an item pickup 150, a user-operated device 130 having a mobile application 131 and store server having a transaction manager 141.

The system 100 represents a store laid out in three areas: the store retail space 110, the item storage and item pick area 120, and an item pickup area 150 (accessible to the customer through: a drive-thru on the exterior of the store, pullup space, or other designated area).

The physical layout and space of the retail space 110 is substantially smaller than a conventional retail store and may be substantially smaller than the item storage and pick area 120.

The aisles 111 do not include items being sold by the store within the retail space 110; rather, the items are depicted as printed images with barcodes or Quick Response (QR) codes on the billboard paper 112 that covers the walls or the aisles 111. In fact, the retail space 110 may not even include any shelving; rather, the billboard paper 112 is used to construct the aisles 111 using poles. As a result, the aisles 111 are substantially smaller than convention retail aisles.

Any changes made to item pricing, item offers, new items, or no longer available items are printed on a new section of the billboard paper with the item scan codes (barcodes and/or QR codes) and hung in the appropriate area within the aisles 111 or on the poles used to construct the aisles 111.

The retail space 110 may also include POS terminals 113 manned by cashiers of the store and/or SSTs for self-checkout by the customers.

The item storage and item pick area 120 includes the physical items 122 being sold from the retail space through the item coded images of the items printed on the billboard paper 112. As a result, the physical items can be more efficiently organized with the area 120. Customers are not allowed in the area 120; rather it is manned by store pickers who receive items purchase notifications from the transaction manager 141 as customers scan item codes for specific items from the billboard paper using the customer (user) operated device 130 and a mobile application 131 executing on device 130.

In an embodiment, when a customer scans a first item, the transaction manager 141 creates a transaction identifier for that user-operated device 130 and provides the transaction identifier and item information for the scanned item to the display devices 121 of the area 120. The pickers can then associate that item and any subsequent received items received from the transaction manager 141 with a single transaction through the transaction identifier.

In an embodiment, the item codes are identified through item lookups by the transaction manager 141 and the item information presented in real time to the display devices 121 for immediate picking from the physical items 122 by the pickers in the area 120. In an embodiment, the transaction manager 141 delays providing the item information to the display devices 121 by a configured amount of elapsed time (such as a minute).

The customer interacts with the mobile application 131 to access a camera of the device 130 and scan the desired item codes from the billboard paper 112. The mobile application 131 interacts through a wireless connection directly with the transaction manager 141 of the server 140 (which can be local to the store, external to the store, or a cloud processing environment networked to the store).

As item codes are scanned, a cart in the mobile application tabulates a running total after the customer affirmatively selects information for a scanned item code to be placed in the customer's cart being maintained by the mobile application 131 and the transaction manager 141. This allows the customer to scan item codes without indicating that the customer wants to but those items. Item codes are processed by the transaction manager 141 for the transaction when the customer affirmatively indicates that the item codes are to be moved to the customer's cart.

The transaction associated with the assigned transaction identifier (assigned by the transaction manager 141 on the first item code scanned and affirmatively placed in the cart) is closed when the customer activates a cart checkout option from a customer-facing interface of the mobile application 131.

In an embodiment, as a customer uses the mobile application 131 to scan an item code, details of the item are presented on the display of the device 130. These details can include item descriptions, item contents, item nutritional information (health-related information), item price, promotions available for the items, and other details. An option selectable from the mobile application 131 may even present comparable items (not scanned) in a side-by-side view for customer inspection. This allows the customer to shop through the store as the customer would shop online and perform instore comparison shopping. A traditional in-store shopping experience does not and cannot provide such information to the customer in real time when a customer picks up a physical item from a shelf. In this way, the system 100 provides all the benefits of online shopping within in-store shopping.

The mobile application 131 allows the customer to select a variety of payment methods for payment through the mobile application 131 (through interaction with the transaction manager 141) or through a POS terminal 113 or SST 114 located in the retail space 110. During checkout, the customer may also present any loyalty account to the mobile application 131, the clerk operating the POS terminal 113, or through a transaction interface on the SST 114.

When the customer checks out at the SST 114 or the POS terminal 113, the customer can provide the transaction identifier presented on a display of the device 130 by the mobile application 131.

In an embodiment, a QR code on a SST 114 can be scanned using the mobile application 131 and the transaction manager 141 in response to the QR code being sent from the mobile application 131 can automatically configure the SST 114 for the customer's transaction. This approach can also be used at the POS terminal 113 to configure the clerk operated terminal 113 for the transaction and transaction payment.

Once a customer pays for the items being purchased, the transaction manager 141 presents a transaction completed notice on the display devices 121 with the corresponding transaction identifier for the transaction (being maintained during the shopping by the transaction manager 141 based on a customer identifier and/or a registered device identifier for the device 130.

While the customer was shopping, the pickers in the pick area 120 were fulling the order for the items of the transaction by picking the physical items 122 bagging the items 122. Thus, when the customer exits the retail space and pulls through the drive-thru item pickup 150 and presents the transaction identifier and/or customer name to the staff manning the pickup 130, the customers bagged items 122 are retrieved and provided to the customer. Staff may place the bagged items 122 in the vehicle for the customer as well at the item pickup 150.

The system 100 eliminates the need for store item stockers, reduces store space needs, substantially reduces the retail space, provides an in-store shopping experience to customers with online shopping capabilities, eliminates the need for customer item handing and bagging, eliminates the need to have and maintain customer carts for items being purchased within the store and the store premises, and substantially improves customer and store efficiencies during the shopping experience.

In an embodiment, some aisles 111 of the retail space 110 may include some physical items, such as perishable goods (produce and/or meats).

In an embodiment, when a customer scan a perishable item's code from the billboard paper 112, the mobile application 131 presents the available stock for the perishable items through cameras located in the pick area 120. The customer gets a live feed of the perishable items and can select desired perishable items, when a selection is made the transaction manager 141 specifically provides the pickers with the exact location of the selected perishable items.

In an embodiment, the retail space may also include one or more digital signs (a type of display device) that displays some of the item images and item codes for scanning.

In an embodiment, the pick area 120 includes robotic pickers that pick the items 122 in such an embodiment, the robotic pickers may directly interact and receive item information from the transaction manager 141.

In an embodiment, the aisles 111 are approximately 1 to 1.5 feet apart or deep. As a result, the retail space 110 is substantially thinner than conventional stores where the aisles are approximately 8 feet apart or deep (because of customer carts and items on shelves of the aisles).

A "display device" as used herein refers to a device that includes a processor, memory, storage, software that executes on the processor, and at least one interfaced hardware display to which the content is visually rendered in one or more display screens within the display.

In an embodiment, the device 130 is one of: a phone, a tablet, and a wearable processing device.

In an embodiment, the store server 140 is maintained locally with the store.

In an embodiment, the store server 140 is remotely maintained at a different geographical location from that which is associated with the store.

These embodiments and other embodiments are now discussed with reference to the FIGS. 2-4.

Figure 2:
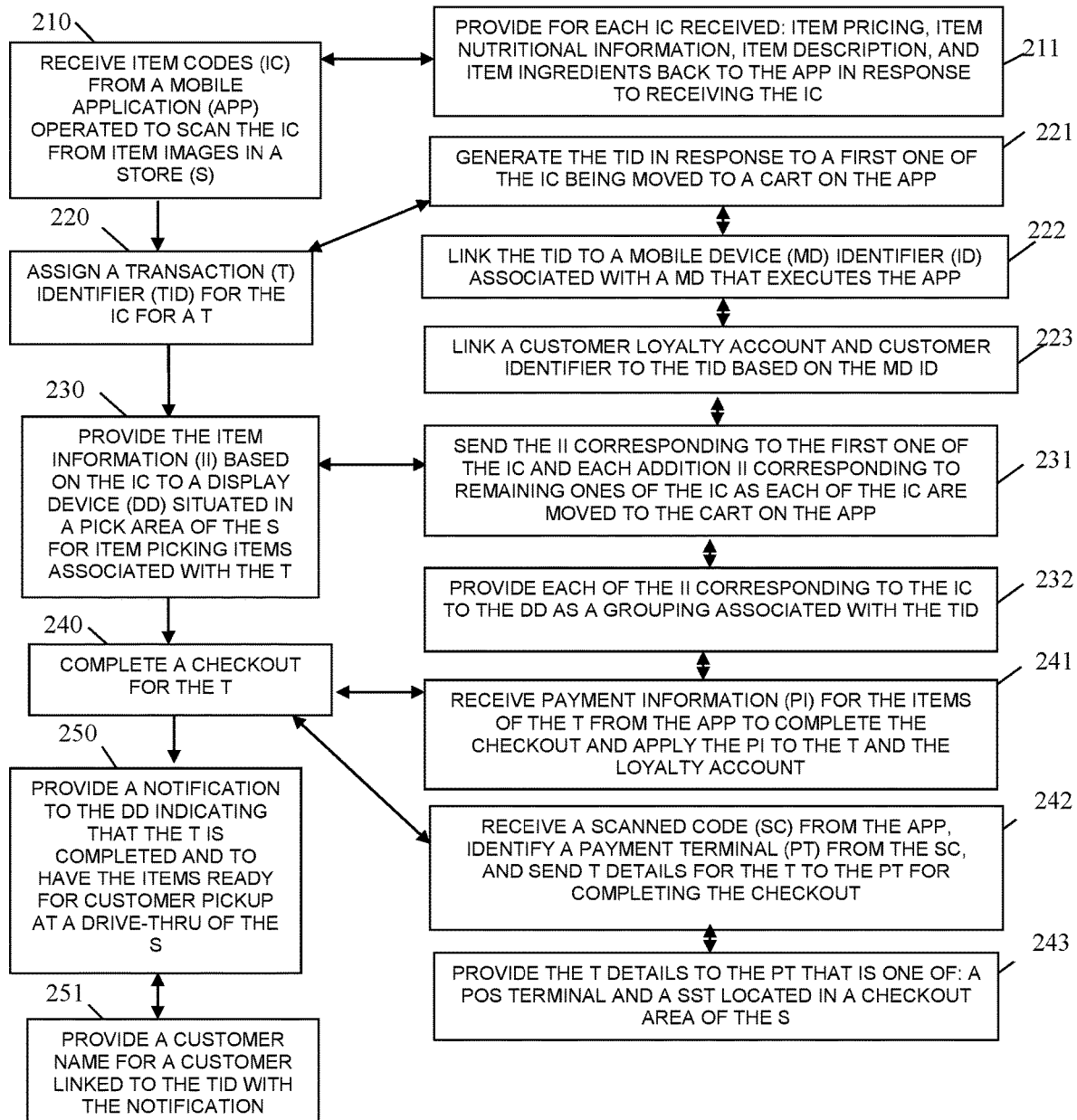
FIG. 2 is a diagram of a method for coded scan-based item processing, according to an example embodiment.

FIG. 2 is a diagram of a method 200 for coded scan-based item processing, according to an example embodiment. The software module(s) that implements the method 200 is referred to as a "transaction manager." The transaction manager is implemented as executable instructions programmed and residing within memory and/or a non-transitory computer-readable (processor-readable) storage medium and executed by one or more processors of a device. The processor(s) of the device that executes the transaction manager are specifically configured and programmed to process the transaction manager. The transaction manager has access to one or more networks during its processing. The networks can be wired, wireless, or a combination of wired and wireless.

In an embodiment, the transaction manager is the transaction manager 141.

In an embodiment, the device that executes the transaction manager is the server 140. In an embodiment, the server 140 is a cloud processing environment.

At 210, the transaction manager receives item codes from a mobile application operated to scan the item codes from item images in a store. The mobile application utilizes a camera to perform the scan of the mobile device that executes the mobile application. It is to be noted that the scans are performed on item images and not on printed or imaged material on the actual physical items associated with the item codes.

In an embodiment, at 211, the transaction manager provides, for each item code received, item nutritional information, item description, and item ingredients back to the mobile application in response to receiving each of the item codes.

At 220, the transaction manager assigns a transaction identifier for the item codes for a transaction associated with purchasing the items and associated with the item codes.

In an embodiment, at 221, the transaction manager generates the transaction identifier in response to a first one of the item codes (or an item identifier associated with the item codes) being moved to a cart on the mobile application.

In an embodiment of 221 and at 222, the transaction manager links the transaction identifier to a mobile device identifier associated with a mobile device that executes the mobile application.

In an embodiment of 222 and at 223, the transaction manager links a customer loyalty account and customer identifier for a customer that operated the mobile device to the transaction identifier based on the mobile device identifier.

At 230, the transaction manager provides item information based on the item codes to a display device situated in a pick area of the store (separate from the retail area where the item codes were scanned at 210) for item picking of items associated with the transaction.

In an embodiment of 223 and 230, at 231, the transaction manager sends the item information corresponding to the first one of the item codes and each additional item information corresponding to remaining ones of the item codes as each of the item codes are moved to the cart on the mobile application.

In an embodiment of 231 and at 232, the transaction manager provides each of the item information corresponding to the item codes to the display device as a grouping associated with the transaction identifier.

At 240, the transaction manager completes a checkout for the transaction.

In an embodiment of 232 and 240, at 241, the transaction manager receives payment information for the items of the transaction from the mobile application to complete checkout and apply the payment information to the transaction and the loyalty account of the customer/user.

In an embodiment, at 242, the transaction manager receives a scanned code from the mobile application, identifies a payment terminal from the scanned code, and sends transaction details for the transaction to the payment terminal for completing the checkout.

In an embodiment of 242 and at 243, the transaction manager provides the transaction details to the payment terminal that is one of: a POS terminal and a SST located in checkout area of the store.

According to an embodiment, at 250, the transaction manager provides a notification to the display device indicating that the transaction is completed and to have the items ready for customer pickup at a drive-thru window of the store.

In an embodiment, at 251, the transaction manager provides a customer name linked to the transaction identifier with the notification.

Figure 3:
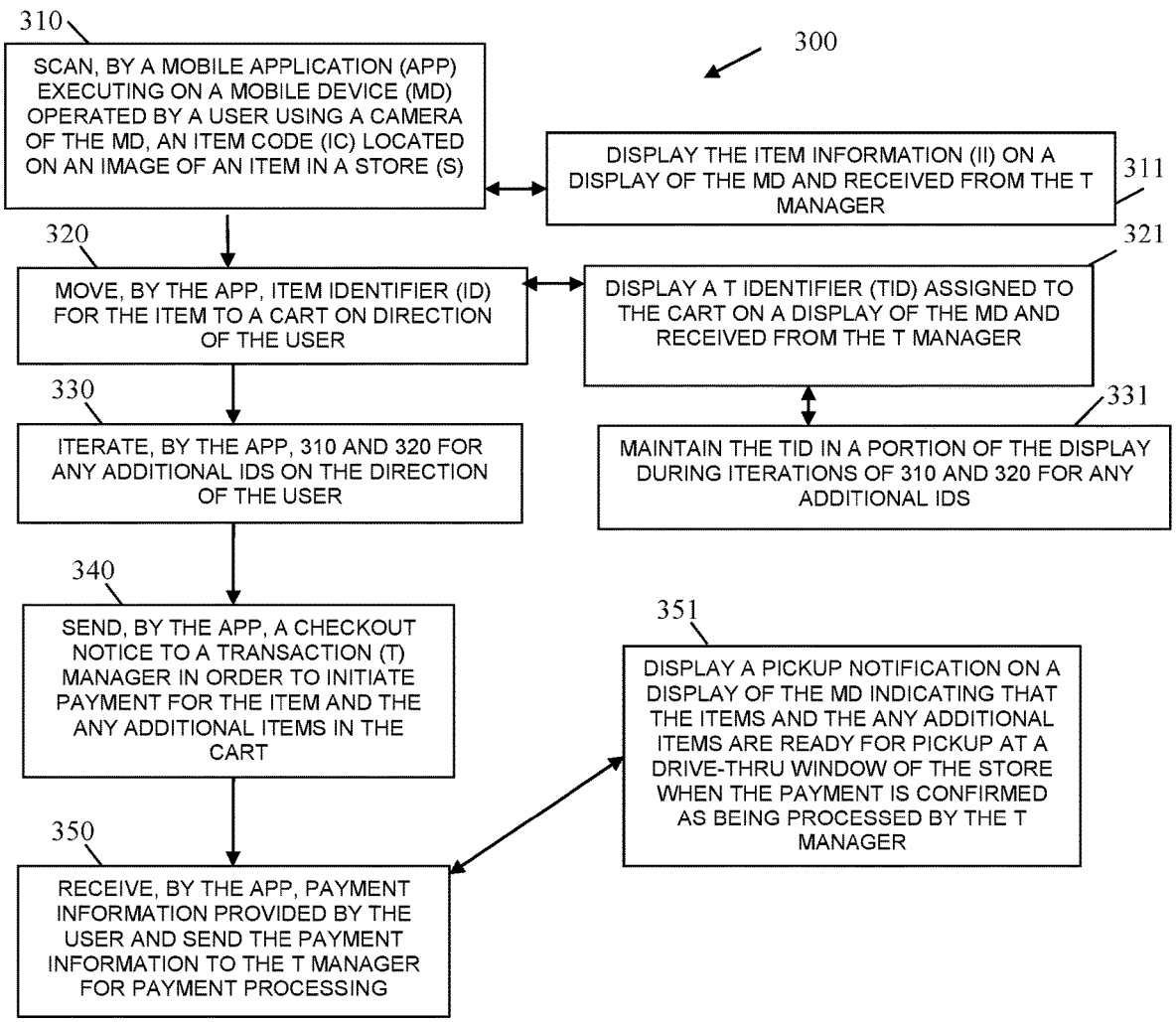
FIG. 3 is a diagram of another method for coded scan-based item processing, according to an example embodiment.

FIG. 3 is a diagram of another method 300 for coded scan-based processing, according to an example embodiment. The software module(s) that implement the method 300 is referred to herein as a "mobile application (app)." The app is implemented as executable instructions and programmed within memory and/or a non-transitory computer-readable (processor-readable) storage medium that executes on one or more processors of a device. The processors of the device are specifically configured to execute the app. The app has access one or more networks; the networks are wireless.

In an embodiment, the app is the mobile application 131.

In an embodiment, the device that executes the app is the user-operated device 130. In an embodiment, the device 130 is one of: a phone, a tablet, and a wearable processing device.

At 310, the app scans an item code located on an image of an item in a store. The image is not a printed image of the item on the physical item; rather the image is not attached or affixed at all to the physical item. The image is obtained from print media that is hung in the store to replace conventional shelf of a conventional store that would include the physical item.

The app executes on a mobile device operated by the user and uses a camera integrated into the mobile device to perform the scan.

In an embodiment, at 311, the app displays item information on a display of the mobile device, the item information received from the transaction manager. In an embodiment, the transaction manager is one or both of: the transaction manager 141 and/or the method 200.

At 320, the app moves the item identifier for the item to a cart on direction of the user/customer.

In an embodiment, at 321, the app displays a transaction identifier assigned to the cart on a display of the mobile device, the transaction identifier received from the transaction manager.

At 330, the app iterates 310 and 320 for any additional item identifiers on direction of the user.

In an embodiment of 321 and 330, at 322, the app maintains the transaction identifier in a portion of the display during iterations of 310 and 320 for any of the additional item identifiers.

At 340, the app sends a checkout notice to a transaction manager in order to initiate a payment for the item and the any additional items in the cart.

In an embodiment, at 350, the app receives payment information provided by the user and sends the payment information to the transaction manager for payment processing.

In an embodiment, at 351, the app displays a pickup notification on a display of the mobile device indicating that the items and the any additional items are ready for pickup at a drive-thru window of the store when the payment is confirmed as having been processed by the transaction manager.

Figure 4:
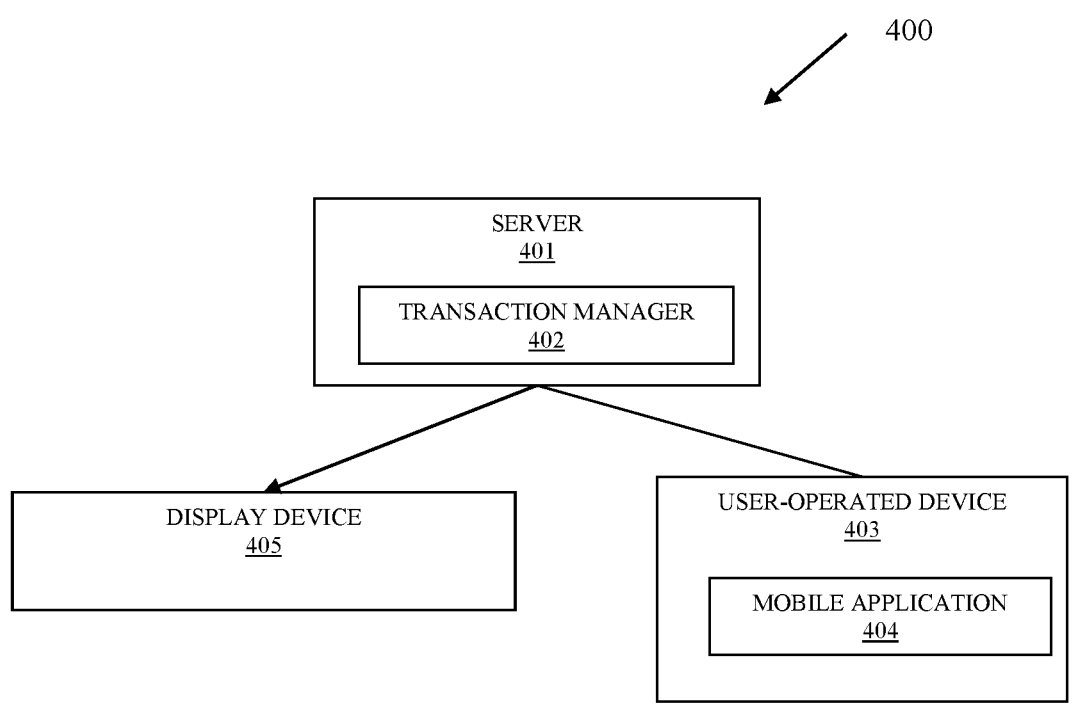
FIG. 4 is a diagram of another system for coded scan-based item processing, according to an example embodiment.

FIG. 4 is a diagram of a system 400 for coded scan-based item processing, according to an example embodiment. Some components of the system 400 are programmed and reside within memory and/or a non-transitory computer-readable medium and execute on one or more processors of devices of the system 400. The system 400 also has access and can communicate over one or more networks; and the networks are wireless, wired, or a combination of wired and wireless.

The system 400 is configured and programed to perform the processing discussed above with the FIGS. 1-3.

The system 400 includes a server 401 having a transaction manager 402, a user operated device 403 having a mobile application (app) 404, and a display device 405.

In an embodiment, the server is the server 140. In an embodiment, the server 140 is part of a cloud processing environment.

In an embodiment, the transaction manager 402 is all or some combination of one or more of: the transaction manager 141 and/or the method 200.

In an embodiment, the user-operated device 403 is the device 130. In an embodiment, the device 130 is one of: a phone, a tablet, and a wearable processing device.

In an embodiment, the app 404 is all or some combination of one or more of: the mobile application 131 and/or the method 300.

In an embodiment, the display device 405 is one of: a digital sign and a processing enabled device having a display.

The server 401 includes at least one hardware processor configured for executing executable instructions representing the transaction manager 402.

The user-operated device 403 includes at least one hardware processor configured for executing executable instructions representing the app 404.

The app 404 executes on at least one hardware processor of the user-operated device 403 and is configured to: (i) scan item codes from item images of items displayed in a retail area of the store from print media and not from the items, the print media replaces conventional store shelves that house the items, (ii) move select item identifiers for select items to a cart based on user direction, and (iii) send a checkout notice to the transaction manager 402 on user direction.

The transaction manager 402 executes on at least one hardware processor of the server 401 and is configured to: (i) lookup item information for the item codes when provided by the mobile application 404, (ii) provide the item information to the mobile application 404 to display on a display of the mobile device 403, (iii) send select item information for the select item identifiers to the display device 405 for immediate picking of the items in the picking and fulfillment area of the store as soon as each select item identifier is placed in the cart, and (iv) facilitate a payment for select items associated with the select item identifiers in response to receiving the checkout notice from the mobile application 404.

In an embodiment, the transaction manager 402 is further configured, in (iv) to facilitate the payment by one of: interaction with the mobile application 404 to receive payment information, interaction with a POS terminal located in the retail area of the store, and interaction with a SST located in the retail area of the store.

In an embodiment, the retail area is the retail space 110.

In an embodiment, the picking and fulfillment area is the item storage and item pick area 120.

It should be appreciated that where software is described in a particular form (such as a component or module) this is merely to aid understanding and is not intended to limit how software that implements those functions may be architected or structured. For example, modules may be illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors of a single device, or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
  receiving item codes from a mobile application operated to scan the item codes from item images in a store, wherein receiving further includes receiving the item codes from a retail area of the store that lacks physical items for items and only item images representing the items are visible within the retail area of the store;
  assigning a transaction identifier for the item codes for a transaction, wherein assigning further includes generating the transaction identifier in response to a first one of the item codes being moved to a cart on the mobile application;

providing the item information based on the item codes to a display device situated in a pick area of the store for item picking of the items associated with the transaction, wherein the pick area is a different area of the store from the retail area associated with shopping for the items and the receiving; and completing a checkout for the transaction.

2. The method of claim 1, wherein receiving further includes providing for each item code received: item pricing, item nutritional information, item description, and item ingredients back to the mobile application in response to receiving the item codes.

3. The method of claim 1, wherein generating further includes linking the transaction identifier to a mobile device identifier associated with a mobile device that executes the mobile application.

4. The method of claim 3, wherein linking further includes linking a customer loyalty account and customer identifier to the transaction identifier based on the mobile device identifier.

5. The method of claim 4, wherein providing further includes sending the item information corresponding to the first one of the item codes and each additional item information corresponding to remaining ones of the item codes as each of the item codes are moved to the cart on the mobile application.

6. The method of claim 5, wherein providing further includes providing each of the item information corresponding to the item codes to the display device as a grouping associated with the transaction identifier.

7. The method of claim 6, wherein completing further includes receiving payment information for the items of the transaction from the mobile application to complete the checkout and applying the payment information to transaction and the loyalty account.

8. The method of claim 1 further comprising, providing a notification to the display device indicating that the transaction is completed and to have the items ready for customer pickup at a drive-thru of the store.

9. The method of claim 8, wherein providing further includes providing a customer name for a customer linked to the transaction identifier with the notification.

10. A method, comprising:
receiving item codes from a mobile application operated to scan the item codes from item images in a store, wherein receiving further includes receiving the item codes from a retail area of the store that lacks physical items for items and only item images representing the items are visible within the retail area of the store;

assigning a transaction identifier for the item codes for a transaction;

providing the item information based on the item codes to a display device situated in a pick area of the store for item picking of the items associated with the transaction, wherein the pick area is a different area of the store from the retail area associated with shopping for the items and the receiving; and completing a checkout for the transaction, wherein completing further includes receiving a scanned code from the mobile application, identifying a payment terminal based on the scanned code, and sending transaction details for the transaction to the payment terminal for completing the transaction.

11. The method of claim 10, wherein sending further includes providing the transaction details to the payment terminal that is one of:
a Point-Of-Sale (POS) terminal and a Self-Service Terminal (SST) located in a checkout area of the store.

* * * * *